United States Patent [19]

Valyocsik

[11] Patent Number: 5,063,039

[45] Date of Patent: Nov. 5, 1991

[54] SYNTHESIS OF KENYAITE-TYPE LAYERED SILICATE MATERIAL AND ITS POLYMERIC CHALCOGENIDE INTERCALATES

[75] Inventor: Ernest W. Valyocsik, Yardley, Pa.

[73] Assignee: Mobil Oil Corp., Fairfax, Va.

[21] Appl. No.: 434,951

[22] Filed: Nov. 9, 1989

Related U.S. Application Data

[63] Continuation-in-part of Ser. No. 245,607, Sep. 19, 1988, abandoned.

[51] Int. Cl.$^5$ .................. C01B 33/28; B01J 21/00
[52] U.S. Cl. .................... 423/329; 502/60; 502/232
[58] Field of Search ............ 423/332, 333, 329; 502/84, 60, 232

[56] References Cited

U.S. PATENT DOCUMENTS

| | | | |
|---|---|---|---|
| 4,600,503 | 7/1986 | Angevine et al. | 208/251 H |
| 4,626,421 | 12/1986 | Zones | 502/60 |
| 4,632,815 | 12/1986 | Valyocsik | 423/332 |
| 4,791,008 | 12/1988 | Chu et al. | 423/332 |
| 4,812,222 | 3/1989 | Kirker et al. | 502/84 |

OTHER PUBLICATIONS

Breck, Zeolite Molecular Sieves, Chapter 2, p. 31 (1974).
Eugster, H. P., "Hydrous Sodium Silicate from Lake Magadi, Kenya: Precursors of Bedded Chert", Science, 157, p. 1177 (1967).
Beneke, K. and Gerhard Lagaly, "Kenyaite-Synthesis and Properties", American Mineralogist, vol. 68, pp. 818-826 (1983).

*Primary Examiner*—Carl F. Dees
*Attorney, Agent, or Firm*—Alexander J. McKillop; Charles J. Speciale; Dennis P. Santini

[57] ABSTRACT

An improved, economical and reproducible method for preparing synthetic Kenyaite-type layered crystalline silicate exhibiting high crystallinity and purity, catalytic utility and other valuable properties is provided. The method comprises forming a reaction mixture containing a source of alkali metal cations, organic agent, a source of silicon, a source of non-alkali metal, optionally aluminum, and water. The pillared layered crystalline silicate is also provided.

21 Claims, 1 Drawing Sheet

SYNTHESIS OF KENYAITE-TYPE LAYERED SILICATE MATERIAL AND ITS POLYMERIC CHALCOGENIDE INTERCALATES

CROSS-REFERENCE TO RELATED APPLICATION

This is a continuation-in-part of application Ser. No. 245,607, filed Sept. 19, 1988, now abandoned.

BACKGROUND OF THE INVENTION

This invention relates to a novel improved direct synthesis of Kenyaite-type layered crystalline silicate under hydrothermal conditions from an organic system.

The fundamental unit of crystalline silicate structures is a tetrahedral complex consisting of the Si cation in a tetrahedral coordination with four oxygens. In some structures, the tetrahedra link to form chains which result in fibrous or needlelike morphologies. Single chains result when $SiO_4$ tetrahedra are joined at two oxygen atoms.

In other silicate structures, the tetrahedra are linked in layers or sheets as in mica minerals. Similar arrangement of the tetrahedra are found in clay minerals wherein two types of sheets may exist, one consisting of aluminum, iron or magnesium ions in a six-fold coordination with oxygens. The layer or sheet structures result from linking between three corners of each tetrahedron to neighboring tetrahedra. Breck, *Zeolite Molecular Sieves*, John Wiley & Sons, New York, p. 31 (1974) reports that these layer or sheet structures do not have three-dimensional stability and may expand if the layers are forced apart by water, other molecules or ions, and thus, differ from silicates referred to as zeolites which have a framework, three-dimensional structure.

This invention is directed to a novel direct synthesis of Kenyaite-type layered crystalline silicate designated "MCM-25" which is characterized by a unique X-ray diffraction pattern, and to its polymeric chalcogenide intercalcates. Until now, such layered silicates have been found in natural deposts (H. P. Eugster, "Hydrous Sodium Silicate From Lake Magadii, Kenya; Precursors in Bedded Chert", *Science*, 157, 1177–1180 (1967)) or have been synthesized from inorganic systems (K. Beneke and G. Lagaly, "Kenyaite-Synthesis and Properties", *Amer. Minerologist*, 68, 818–826 (1983), and copending application for U.S. Pat. Ser. No. 879,787, filed June 27, 1986 now U.S. Pat. No. 4,859,684.

SUMMARY OF THE INVENTION

An improved, economical and reproducible method for preparing synthetic Kenyaite-type layered crystalline silicate exhibiting high crystallinity and purity, catalytic activity and other valuable properties is provided. The method comprises forming a reaction mixture containing a source of alkali metal cations, organic agent, hereinafter more particularly defined, a source of silicon, a source of non-alkali metal, optionally aluminum, and water. It is to be understood that for the purposes of the present description, the term "silicate" can include materials wherein the tetravalent Si is partially substituted by other atoms, e.g. Al, B, Cr, Fe, and Ge.

The invention is further directed to methods for intercalating the layered silicate product of the improved method and the resulting intercalated products (intercalates).

The invention is also directed to a pillared layered silicate derived from the product of the improved method which comprises between its layers a chalcogenide of an element selected from groups IB, IIB, IIIA, IIIB, IVA, IVB, VA, VB, VIB, VIIB and VIII of the Periodic Table. This chalcogenide may be in amorphous, crystalline or zeolite form.

EMBODIMENTS

Figure 1:
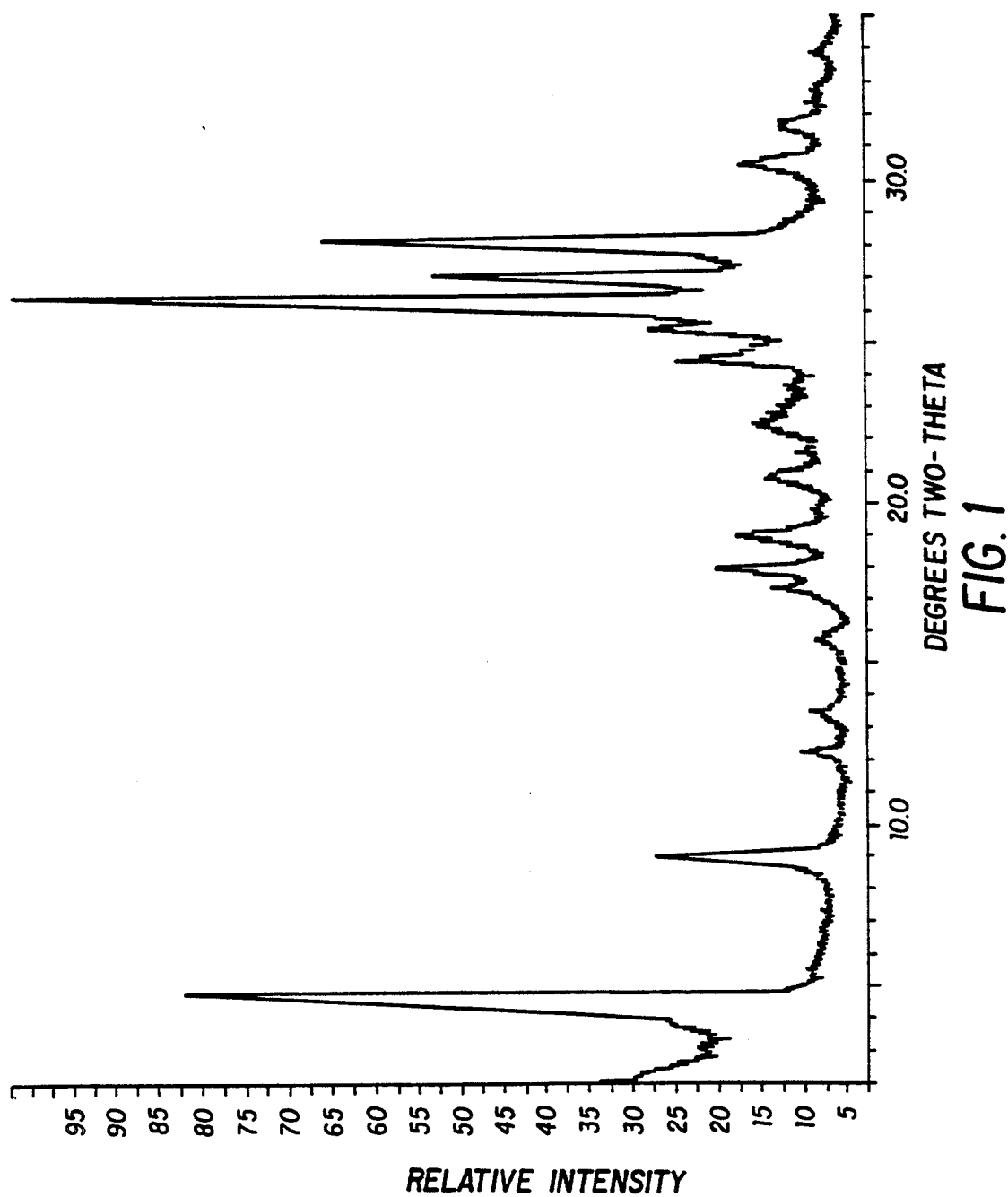
FIG. 1 is a reproduction of an X-ray diffraction trace of a sample of as-synthesized Kenyaite-type silicate product of Example 3.

When synthetic Kenyaite-type silicate is prepared by the present method, it exhibits valuable properties for such materials in that it is highly crystalline, very pure and easily intercalated and pillared. The method is an improvement over the art in that it is reproducible and economical in providing the highly crystalline, pure synthetic Kenyaite-type material having such properties. The product crystalline material hereof demonstrates valuable utility as a catalyst component, e.g., low activity support, for various chemical conversion processes. Such process mechanisms include (1) formation or rupture of carbon-carbon bonds, such as cracking, isomerization, polymerization, alkylation and olefin dismutation; (2) formation or rupture of carbon-hydrogen bonds, such as hydrogenation, dehydrogenation, hydrogen transfer and hydrogenolysis; (3) conversion of oxygenates to other oxygenates or hydrocarbons as well as other reactions involving heteroatom-containing organic compounds; (4) oxidation of alkanes, alkenes and aromatic hydrocarbons; and (5) the reactions of unsaturated hydrocarbons with carbon oxides.

The improved method of this invention for synthesizing highly crystalline, pure, Kenyaite-type layered silicate comprises (i) preparing a mixture capable of forming said layered silicate, said mixture comprising sources of alkali metal cations (AM), silicon, non-alkali metal (M), water and organic agent (R), and having a composition, in terms of mole ratios, within the following ranges:

| | Broad | Preferred |
| --- | --- | --- |
| $SiO_2/M_mO_n$ | at least about 40 | 40 to 5,000 |
| $H_2O/SiO_2$ | 5 to 200 | 10 to 100 |
| $OH^-/SiO_2$ | 0 to 5 | 0.1 to 2 |
| $AM/SiO_2$ | 0.05 to 3 | 0.1 to 1 |
| $R/SiO_2$ | 0.01 to 3 | 0.05 to 2 | wherein n is the valence of M, (ii) maintaining said mixture under sufficient conditions until crystals of said silicate are formed, and (iii) recovering said silicate having a highly crystalline Kenyaite-type layered structure. The quantity of $OH^-$ is calculated only from inorganic sources of alkali without any organic base contribution.

Metal M may include any one or more of metals from Periodic Table Groups IVB (e.g. titanium), IIIA (e.g. aluminum, gallium, indium and thallium), VIB (e.g. chromium), IVA (e.g. germanium, tin and lead) and VIII (e.g. iron). Organic R may include any organic which acts as a mineralizer to promote crystallization from the above reaction mixture. Examples of such organic agents include alkylamine, trialkylamine, tetraalkylammonium compound wherein alkyl has 1 to about 12 carbon atoms, e.g. tetrapropylammonium, and trimethylhexamethylene diamine.

Hydrothermal reaction conditions for crystallizing the present product from the above mixture include heating the reaction mixture to a temperature of from about 60° C. to about 250° C. for a period of time of from about 6 hours to about 60 days. A more preferred temperature range is from about 100° C. to about 200° C. with the amount of time at a temperature in such range being from about 8 hours to about 5 days.

The reaction is carried out until a fully crystalline product is formed. The solid product comprising highly crystalline Kenyaite-type layered silicate is recovered from the reaction medium, as by cooling the whole to room temperature, filtering and water washing.

The reaction mixture composition for the synthesis of synthetic crystalline silicate hereby can be prepared utilizing materials which can supply the appropriate oxide. Such compositions include metal (M) salts or oxides and, when a separate source of aluminumis desired, aluminates or alumina; and silicates, silica hydrosol, silica gel, silicic acid and hydroxides. It will be understood that each oxide component utilized in the reaction mixture for preparing the present silicate can be supplied by one or more essential reactants and they can be mixed together in any order. For example, any oxide can be supplied by an aqueous solution, sodium hydroxide or by an aqueous solution of a suitable silicate. The reaction mixture can be prepared either batchwise or continuously. Crystal size and crystallization time for the product composition comprising the present silicate will vary with the exact nature of the reaction mixture employed.

Useful sources of silicon for the reaction mixture of the present invention include solid silicas or silica precursors. Such sources are cost effective and allow high solids loading of the reaction mixture. The use of a solid silica, e.g. Ultrasil (a precipitated, spray dried silica) or HiSil (a precipitated hydrated $SiO_2$ containing about 6 weight percent free $H_2O$ and about 4.5 weight percent bound $H_2O$ of hydration and having a particle size of about 0.02 micron) as the oxide of silicon source provides economic synthesis. Such solid silica sources are commercially available.

The silica precursor source of silicon for the present reaction mixture is an amorphous silica precipitate made from a solution of a soluble silica source. Conveniently, the solution is an aqueous solution of a pH ranging from 9 to 12. The source of silica can be any soluble silicate and is preferably sodium silicate. The silica precursor is formed by its continuous precipitation from the solution phase. Accordingly, precipitation comprises initiating precipitation and maintaining said precipitation.

Alteration of the composition of the solution of soluble silica source is undertaken by introducing a precipitating reagent. In one embodiment, the precipitating reagent is a source of acid. Thus, the precipitating reagent can be an acid solution. The acid of the solution may be any mineral acid, such as $H_2SO_4$, HCl, $HNO_3$, etc., and can have a pH ranging from essentially 0 to about 6. Thus, precipitation of the silica precursor can be effected by acid neutralization of a basic solution of a silicate.

The silica can be precipitated alone in the absence of sources of other zeolitic framework elements, e.g. aluminum. In this fashion, both the precipitating reagent and the solution of silica source can be free of intentionally added alumina or alumina source. That is, no aluminum is deliberately added to the silica precipitation reaction mixture, in this embodiment; however, aluminum is ubiquitous and the presence of such a material in minor amounts is due to impurities in the precursors of the reactants or impurities extracted from the reaction vessel. When no source of alumina is added, the amount of alumina in the silica precursor precipitate will be less than about 0.5 weight percent, and generally less than 0.2 weight percent. When a source of alumina is added, the amount of alumina in the silica precursor precipitate will be up to about 5 weight percent. Silicate precipitation can be coprecipitation in the presence of soluble sources of other zeolite framework elements including gallium, indium, boron, iron and chromium. The soluble source of these other zeolitic framework components can be, for example, nitrates. The coprecipitation product would be amorphous, for example an amorphous gallosilicate, borosilicate or ferrosilicate.

Continuous precipitation of the amorphous silica precursor may comprise introducing the solution of silica source and the precipitating reagent to a reaction zone while maintaining a molar ratio of silica source to precipitating reagent substantially constant. For example, the precipitating reagent and the silica source are introduced simultaneously into the reaction zone.

The continuous precipitation of silica precursor effects two results. Firstly, silica gel formation is at least substantially eliminated and secondly, precipitated silica precursor particle size exceeds that silica particle size at which silica gel formation is possible. The precipitated silica precursor comprises agglomerated solids in the shape of microspheres. Suspensions of these particles exhibit low viscosities at high solids loading in the subsequent zeolite synthesis reaction mixture of the present invention, even at solids loading equal to or greater than about 20–40%. The particle size of the precipitated silica precursor ranges between 1–500 microns, but the average size is 50–100 microns.

Other conditions affecting precipitation of silica precursor include time, pH and temperature. The temperature of the precipitation mixture can range from 80° F. to 300° F. (about 27° C. to 150° C.). The time of contact of the solution of silica source and the precipitating reagent can range from about 10 minutes to several hours at pH maintained from about 6 to 11. Generally, the silica precursor is processed by isolating it, for example by filtration, and removing soluble contaminants therefrom by washing and/or ion exchange. This stage can be considered a solids consolidation step.

The Kenyaite-type silicate composition as prepared hereby has a characteristic X-ray diffraction pattern, the values of which include those set forth in Table 1, hereinafter. The silicate composition as prepared hereby can also be indetified, in terms of mole ratios of oxides and in the anhydrous state, as-synthesized, as follows:

$(0-5)R_2O:(0-5)AM_2O:M_mO_n:x\ SiO_2$ wherein AM, M, n and R are as defined above, and x is at least about 40, such as, for example, from about 40 to infinity.

TABLE 1

| Interplanar d-Spacing (A) | Relative Intensity ($I/I_o$) |
|---|---|
| 19.9 ± 0.3 | m |
| 9.90 ± 0.2 | w |
| 7.27 ± 0.15 | w |
| 6.60 ± 0.1 | w |
| 5.14 ± 0.1 | w |

TABLE 1-continued

| Interplanar d-Spacing (A) | Relative Intensity ($I/I_o$) |
|---|---|
| 4.96 ± 0.08 | w |
| 4.70 ± 0.08 | w |
| 4.28 ± 0.08 | w |
| 3.98 ± 0.07 | w |
| 3.64 ± 0.07 | w |
| 3.52 ± 0.07 | w |
| 3.43 ± 0.05 | vs |
| 3.32 ± 0.04 | s |
| 3.20 ± 0.04 | s |
| 2.94 ± 0.03 | w |
| 2.83 ± 0.03 | w |
| 2.65 ± 0.03 | w |
| 2.52 ± 0.03 | w |
| 2.48 ± 0.02 | w |
| 2.42 ± 0.02 | w |
| 2.33 ± 0.02 | w |
| 2.25 ± 0.01 | w |
| 1.99 ± 0.01 | w |
| 1.83 ± 0.01 | w |

These X-ray diffraction data were collected with a Rigaku diffraction system, equipped with a graphite diffracted beam monochromator and scintillation counter, using copper K-alpha radiation. The diffraction data were recorded by step-scanning at 0.02 degrees of two-theta, where theta is the Bragg angle, and a counting time of 1 second for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (75-100), s=strong (50-74), m=medium (25-49) and w=weak (0-24). It should be understood that diffraction data listed for this sample as single lines may consist of multiple overlapping lines which under certain conditions, such as differences in crystallite sizes or very high experimental resolution or crystallographic changes, may appear as resolved or partially resolved lines. Typically, crystallographic changes can include minor changes in unit cell parameters and/or a change in crystal symmetry, without a change in topology of the structure. These minor effects, including changes in relative intensities, can also occure as a result of differences in cation content, framework composition, nature and degree of pore filling, and thermal and/or hydrothermal history.

The present invention is particularly useful in that it permits the preparation from MCM-25 synthesized hereby of pillared layered silicate materials of relatively high d-spacing, e.g. greater than about 10, 11, 12, 15, 18, 20, or even 30 angstroms. Such materials are capable of being exposed to severe conditions, such as those encountered in calcining, without significant decrease in interlayer distance. The amount of chalcogenide deposited between the layers and contained within the final product can be greatly varied because the chalcogenide precursor species can be introduced in an electrically neutral form such that the amount of material incorporated within the layered chalcogenide is not dependent upon the charge density of the original layered chalcogenide. This allows the formation of materials with widely varying interlayer spacing, further distinguishing the present invention from the prior art.

The extent of interlayer separation can be estimated by using standard techniques such as X-ray diffraction to determine the basal spacing, also known as "repeat distance" or "d-spacing". These values indicate the distance between, for example, the uppermost margin of one layer with the uppermost margin of its adjoining layer. If the layer thickness is known, the interlayer spacing can be determined by subtracting the layer thickness from the basal spacing.

In one embodiment of the invention, the pillared synthetic layered silicate comprises $SiO_2$ or tetraalkylorthosilicate, wherein alkyl R' has 1 to 8 carbon atoms, hereinafter $(R'O)_4Si$, or hydrolysis products of $(R'O)_4Si$ interposed between lamina of the MCM-25 layered silicate. In other words, the intercalated product comprises said lamina supported or pillared by material comprising $SiO_2$ or $(R'O)_4Si$ or hydrolysis products of $(R'O)_4Si$. The pillared product can be formed by hydrolysis of $(R'O)_4Si$ in the $(R'O)_4Si$ impregnated layered silicate.

Another embodiment of the invention is directed to a product obtained by swelling the layered silicate MCM-25 prior to treatment with the pillaring agent, which provides interlayer chalcogenide, by treatment with an aliphatic amine or by a mixture of said aliphatic amine and polar solvent for said aliphatic amine.

In yet another embodiment, in which the swelling treatment of the layered silicate MCM-25 comprises contacting it with the alkylamine, that layered silicate is pretreated with acid.

The products pillared or intercalated by interposing deposits of said chalcogenides between the lamina of the layered silicate MCM-25 are characterized by sorption properties and stability which differ from that of unpillared MCM-25.

Calcination of the dried MCM-25 silicate results in a material of very low surface area, indicating collapse of the layers and phase change of the dried silicate structure. In the Examples calcination was undertaken in an inert atmosphere. Lower temperatures, as well as higher temperatures of calcination may be employed.

In another embodiment of the present invention, the layered silicate MCM-25 can be intercalated with an interspathic polymeric chalogenide, such as polymeric silica.

The resulting intercalated layered silicate of the present invention comprises a layered silicate and interspathic polymeric chalcogenide of at least one element separating the silicate layers. Preferably, such materials after pillaring are thermally stable, i.e. capable of withstanding calcination at a temperature of about 450° C. for at least 2 hours without significant reduction (e.g. not greater than 10 or 20%) in the spacing between the chalcogenide layers. The method used for intercalating the layered silicate material is taught in U.S. application Ser. No. 879,787, filed June 27, 1986, European Patent Publication EPA 0205711, and U.S. Pat. No. 4,600,503, the entire contents of each being incorporated herein by reference.

For purposes of the present invention the term "chalcogenide" includes members of the group consisting of oxides, sulfides, selenides, tellurides, and polonides of elements other than those of Periodic Table Group VIA. Oxides are particularly preferred as the interspathic polymeric chalcogenide. For present purposes, polymeric chalcogenides are considered to include chalcogenides of two or more repeating units, preferably three or more repeating units, say four or more or even five or more repeating units. The extent of polymerization of the interspathic polymeric chalcogenide is believed to affect the ultimate interlayer separation of the layered silicate product.

In preparing the intercalated layered silicate material, the interlayer spacing of the layered silicate material can be tailored by careful selection of the "propping" agent used to separate the layers during treatment with the interspathic polymeric chalcogenide precursors which are eventually converted to the thermally stable polymeric chalcogenide "pillars". Indeed, a wide range of interlayer spacings can be achieved in preparing layered materials of the present invention. Interlayer distances can range anywhere from 2 to 30 angstroms or more, say, e.g. greater than 5, 10, 15 or 20 angstroms, depending largely on the type of "propping" agent used as well as the layered chalcogenide being treated. The layered silicate material when intercalated contains an interspathic polymeric chalcogenide of at least one element selected from Groups IB, IIB, IIIA, IIIB, IVA, IVB, VA, VB, VIB, VIIB, and VIII of the Periodic Table of the Elements (Sargent-Welch Scientific Co., 1968). The intercalated silicate can be prepared by treating the MCM-25 layered silicate which contains ion exchange sites having interspathic cations associated therewith, with an organic compound which is a cationic species or capable of forming a cationic species, to effect exchange with said interspathic cations. An electrically neutral compound capable of conversion to the interspathic polymeric chalcogenide is provided between the layers of the treated layered metal oxide. The compound is then converted to the interspathic polymeric chalcogenide to form the intercalated layered silicate material.

The layered MCM-25 silicate starting material which contains ion exchange sites having interspathic cations associated therewith employs such interspathic cations as hydrogen ion, hydronium ion and alkali metal cation. The starting material is treated with a "propping" agent comprising a source of organic cation such as organoammonium, which may include the cation itself, in order to effect an exchange of the interspathic cations resulting in the layers of the MCM-25 silicate starting material being propped apart. Suitable alkylammonium cations can include n-dodecylammonium, n-heptylammonium, n-hexylammonium and n-propylammonium. The source of organic cation in those instances where the interspathic cations include hydrogen or hydronium ions may include a neutral compound such as an organic amine which is converted to a cationic analogue during the "propping" treatment. The organic cation should be capable of displacing or supplanting the original interspathic cations. In some instances, it may be desirable to remove excess propping agent which is not electrostatically bound within the layered silicate starting material in order to permit the addition of greater amount of polymeric chalcogenide precursor. Such removal may be effected by washing out the propping agent with a material which is soluble with said propping agent. The foregoing treatment can result in the formation of a layered silicate of enhanced interlayer separation depending upon the size of the organic cation introduced. Contact of the layered MCM-25 silicate with the propping agent may be conducted in aqueous medium so that water is trapped between the layers of the "propped" chalcogenide.

After the ion exchange, the organic-"propped" species is treated with a compound capable of forming the above-described polymeric chalcogenide. Preferably, such compounds are capable of forming the polymeric chalcogenide upon hydrolysis or other polymerizing reactions. Hydrolyzable compounds are well-suited as such compounds. It is preferred that the organic cation deposited between the layers is capable of being removed from the layered chalcogenide material without substantial disturbance or removal of the interspathic polymeric chalcogenide. For example, organic cations such as n-octylammonium may be removed by exposure to elevated temperatures, e.g. calcination in nitrogen or air, or chemical oxidation conditions, preferably after the interspathic polymeric chalcogenide precursor has been converted to the polymeric chalcogenide in order to form the intercalated layered material of the present invention.

The polymeric chalcogenide precursor-containing product can be exposed to suitable conversion conditions, such as hydrolysis and/or calcination to form the layered intercalated silicate material of the present invention. The hydrolysis step may be carried out by any suitable method, for example, by utilizing interspathic water already present in organic-"propped" layered silicate material. Because of the effect of interspathic water on hydrolysis, the extent of hydrolysis may be modified by varying the extent to which the organic-"propped" species is dried prior to addition of the polymeric chalcogenide precursor. As noted earlier, the product after conversion to the polymeric chalcogenide form may be exposed to conditions which remove organic compounds such as the organic cation propping agents, e.g. exposure to elevated temperatures such as those encountered by calcining in air or nitrogen.

The pillaring chalcogenide may be in amorphous, crystalline or zeolite form. In a preferred embodiment, the pillaring agents are hydrolyzable to form the chalcogenide pillars. The amount of oxide contained within the final product can be greatly varied because the oxide precursor species are introduced in an electrically neutral form such that the amount of material incorporated within the layered silicate is not dependent upon the charge density of the original layered silicate. This allows the formation of materials with widely varying interlayer spacing. For example, the pillaring agents may be compounds of Si, Al, Fe, Cr, B, Ca, Ga and Mg, used alone or in combination. Preferably, they are compounds of Si and Al. Aluminum compounds can be selected from those including $AlX_3$ (wherein X is halide and preferably is chloride or bromide); $AlR''_3$ (wherein $R''$ is alkyl of 1-10 carbon atoms, straight or branched chain; and $Al(OR'')_3$, such as aluminum isopropoxide. Silicon compounds can be $SiX_4$ siloxanes and tetraalkylorthosilicates. The tetraalkylorthosilicate may be referred as $(RO')_4Si$ wherein $R'$ is alkyl of 1 to 8 carbon atoms; the exact nature of $R'$ is not critical per se except insofar as the compound $(RO')_4Si$ should be hydrolyzable, to hydrolysis products such as $SiO_2$, and capable of penetrating the layered silicate; however, due to its toxicity, it is preferred not to employ the $(RO')_4Si$ in which $R'$ is methyl. $(R'O)_4Si$ impregnation of the layered silicate is accompanied by or followed by hydrolysis of the $(R'O)_4Si$ compound. For example, when the $(R'O)_4Si$ impregnation is undertaken subsequent to acid treatment and alkyl amine impregnation of MCM-25, hydrolysis of $(RO)_4Si$ occurs to produce $SiO_2$ and/or hydrolysis derivatives of $(R'O)_4Si$. Parenthetically, hydrolysis of the $(R'O)_4Si$ also results in the production of the corresponding alcohol. The amount of $(R'O)_4Si$ used should be sufficient to maintain the spacing between the layers of the swollen layered silicate. The amount of (R'O)₄Si should be less than that amount effective to plug the interlayer spaces of the silicate. This intercalcation may be undertaken at ambient conditions of temperature and pressure.

Both the layered silicate MCM-25 and its intercalated silicate counterpart or their calcined products, prepared in accordance herewith, can have the original inorganic cations associated therewith replaced by a wide variety of other cations according to techniques well known in the art. It has not been established whether the organic cations can be removed from the as-synthesized form by ion-exchange. In any case, the silicate is expected to be more selective for the organic than for the replacing cation. Typical replacing cations include hydrogen, ammonium and metal cations including mixtures thereof. Of the replacing metallic cations, particular preference is given to cations of metals such as rare earths, Mn, Ca, Mg, Zn, Rh, Pd, Pt, Ni, Cu, Ti, Al, Sn, Fe and Co. Other treatment, akin to impregnation and ion-exchange of zeolites, to incorporate hydrogenation/dehydrogenation components into the pillared zeolites can be undertaken. Such hydrogenation/dehydrogenation components can be selected from a source of at least one metal selected from Groups IIB, IVB, VIB and VIII of the Periodic Table and mixtures thereof. Incorporation of the hydrogenation/dehydrogenation component may be undertaken on the uncalcined silicate or pillared silicate.

Typical ion exchange technique would be to contact the synthetic silicate or its pillared counterpart with a salt of the desired replacing cation or cations. Although a wide variety of salts can be employed, particular preference is given to chlorides, nitrates, sulfates and acetates.

Representative ion exchange techniques are disclosed in a wide variety of patents including U.S. Pat. Nos. 3,140,249; 3,140,251 and 3,140,253, incorporated herein by reference.

Following contact with the salt solution of the desired replacing cation, the layered silicate or its intercalated counterpart is then preferably washed with water and dried at a temperature ranging from 65° C. to about 200° C. and thereafter may be calcined in air or other inert gas at temperatures ranging from about 200° C. to about 600° C. for periods of time ranging from 1 to 48 hours or more.

The MCM-25 silicate and intercalated silicate is distinct from known clay and synthetic zeolitic materials. Its high $SiO_2/Al_2O_3$ ratio should make it more hydrophobic than clay. The intercalated material has a high surface area and exhibits superior hydrocarbon sorptive properties. These properties should make the MCM-25 silicate and intercalated silicate more versatile than clay as a catalyst carrier. Its measured Alpha Value of about 0.1–2 suggests its efficacy as a catalyst component.

The resulting calcined products exhibit high surface area, e.g. greater than 50 m²/g, and thermal stability (i.e. capable of withstanding calcining at temperatures of about 300° C. for 1 hour without significant reduction.

It may be desirable to use the new layered silicate or its intercalated analogue in combination with a binder or matrix material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occuring or in the form of gelatinous precipitates, sols or gels including mixtures of silica and metal oxides. Use of a material in conjunction with the new silicate, i.e. combined therewith, which is active, may enhance the conversion and/or selectivity of a catalyst including the silicate in certain organic conversion processes. Inactive materials suitably serve as diluents to control the amount of conversion in a given process so that products can be obtained economically without employing other means for controlling the rate of reaction. Frequently, crystalline silicate materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like mterials which cause problems in processing.

Naturally occurring clays which can be composited with the hereby synthesized silicates include the montmorillonite and kaolin families which include the sub-bentonites, and the kaolins commonly known as Dixie, McNamee, Georgia and Florida clays, or others in which the main mineral consitutent is halloysite, kaolinite, dickite, nacrite or anauxite. Such clays can be used in the raw state as originally mined or initially subjected to calcination, acid treatment or chemical modification.

In addition to the foregoing materials, the silicates hereby synthesized can be composited with a porous matrix material such as a silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline silicate and inorganic oxide gel matrix vary widely with the crystalline silicate content ranging from about 1 to about 90 percent by weight, and more usually in the range of about 2 to about 70 percent by weight of the composite.

In order to more fully illustrate the nature of the invention and the manner of practicing same, the following examples are presented. In the examples, whenever adsorption data are set forth for comparison of sorptive capacities for water, cyclohexane and n-hexane, they were determined as follows:

A weighed sample of the calcined adsorbant was contacted with the desired pure adsorbate vapor in an adsorption chamber, evacuated to 1 mm and contacted with 12 mm Hg of water vapor or 40 mm Hg of n-hexane, or cyclohexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period, which did not exceed about 8 hours. As adsorbate was adsorbed by the sorbant material, the decrease in pressure caused the manostat to open a valve which admitted more adsorbate vapor to the chamber to restore the above control pressures. Sorption was complete when the pressure change was not sufficient to activate the monostat. The increase in weight was calcuulated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078; in the *Journal of Catalysis*, vol. 4, p. 527 (1965); vol. 6, p. 278 (1966); and vol. 61, p. 395 (1980), each incorporated herein by reference as to that description. The experimental conditions of the test used herein include a constant temperature of 538° C. and a variable flow rate as described in detail in the *Journal of Catalysis*, vol. 61, p. 395.

EXAMPLES 1-6

Six separate efforts were made to synthesize Kenyaite-type layered silicate directly under hydrothermal conditions from reaction mixtures containing an organic agent. The reaction mixture compositions for each example, in mole ratios, are indicated in Table 2. The metal M salt added to the respective reaction mixtures, if any, and time of reaction in days are also indicated. The organic R added to Example 1 was trimethylhexamethylene diamine. Tetrapropylammonium bromide was the organic R added to the reaction mixtures of Examples 2,5 and 6. Tripropylamine was the organic R added to the Example 3 reaction mixture, and n-propylamine was added to the mixture of Example 4.

The silica source in Example 1 was Q-brand sodium silicate (about 28.5 wt. % SiO$_2$, 8.8 wt. % Na$_2$O and 62.7 wt. % H$_2$O), and in Examples 2-6, silica gel.

The reaction mixtures were stirred at 400 rpm for the reaction duration and maintained at 160° C.

Each example yielded pure 100% crystalline Kenyaite-type layered silicate identified by X-ray analysis as MCM-25.

TABLE 2

| Example | M Salt | Mixture Composition (Mole Ratios) | | | | | |
|---|---|---|---|---|---|---|---|
| | | SiO$_2$/M$_m$O$_n$ | H$_2$O/SiO$_2$ | OH$^-$/SiO$_2$ | Na$^+$/SiO$_2$ | R/SiO$_2$ | Time Days |
| 1 | None | ∞ | 40 | 0 | 0.59 | 0.25 | 3 |
| 2 | In(NO$_3$)$_3$ | 300 | 48 | 0.26 | 0.29 | 0.10 | 0.3 |
| 3 | In(NO$_3$)$_3$ | 300 | 40 | 0.20 | 0.23 | 0.20 | 3 |
| 4 | In(NO$_3$)$_3$ | 300 | 40 | 0.10 | 0.13 | 0.30 | 4 |
| 5 | Ti(OC$_2$H$_5$)$_4$ | 150 | 40 | 0.30 | 0.30 | 0.10 | 5 |
| 6 | SnSO$_4$ | 40 | 40 | 0.30 | 0.31 | 0.10 | 4 |

FIG. 1 is a reproduction of an X-ray diffraction scan of as-synthesized product from Example 3. The X-ray diffraction pattern of the Example 3 product is set forth in Table 3.

TABLE 3

| 2 Theta | d-Spacing | I/Io × 100 |
|---|---|---|
| 4.43 | 19.94 | 42 |
| 8.93 | 9.90 | 15 |
| 12.17 | 7.27 | 3 |
| 13.41 | 6.60 | 3 |
| 17.26 | 5.14 | 5 |
| 17.88 | 4.96 | 13 |
| 18.88 | 4.70 | 10 |
| 20.75 | 4.28 | 6 |
| 22.33 | 3.98 | 11 |
| 24.44 | 3.64 | 16 |
| 25.27 | 3.52 | 22 |
| 25.96 | 3.43 | 100 |
| 26.83 | 3.32 | 51 |

TABLE 3-continued

| 2 Theta | d-Spacing | I/Io × 100 |
|---|---|---|
| 27.84 | 3.20 | 56 |
| 30.35 | 2.94 | 13 |
| 31.61 | 2.83 | 7 |
| 33.88 | 2.65 | 2 |
| 35.57 | 2.52 | 4 |
| 36.27 | 2.48 | 5 |
| 37.19 | 2.42 | 5 |
| 38.51 | 2.33 | 6 |
| 40.05 | 2.25 | 5 |
| 45.70 | 1.99 | 7 |
| 49.82 | 1.83 | 22 |

EXAMPLE 7

Samples of the crystalline products from Example 1-6 were found by chemicial analysis to be composed as shown in Table 4.

TABLE 4

| Example | M | Moles per Mole M$_m$O$_n$ | | | |
|---|---|---|---|---|---|
| | | N$_2$O | Na$_2$O | Al$_2$O$_3$ | SiO$_2$ |
| 1 | Al | 5.6 | 13 | 1 | 250 |
| 2 | In | 0.05 | 12 | <0.07 | 260 |
| 3 | In | 7.4 | 16 | nil | 390 |
| 4 | In | 0.57 | 11 | nil | 360 |
| 5 | Ti | 0.14 | 8.6 | <0.67 | 200 |
| 6 | Sn | 0.01 | 2.3 | nil | 46 |

Based on these analytical results, the organic species appear to be largely excluded from the structure rather than being trapped within the Kenyaite-type silicate product of this invention.

EXAMPLE 8

The synthetic kenyaite-type product hereof is pillared by the following procedure. The as-synthesized material is dispersed in water and acidified with 0.1N HCl to pH=2. The pH of the solution is kept at 2 for 24 hours with addition of acid as needed. The mixture is then filtered, water-washed and vacuum-dried. The dry sample is then treated with a dimethylsulfoxide(D-MSO)/n-octylamine mixture at the weight ratio of 1:2:1 (sample:DMSO:amine) at ambient temperature for 24 hours. The sample is then filtered and dried in air at ambient temperature. The sample is finally suspended in tetraethylorthosilicate (TEOS), 5 g TEOS/1g solid, for 24 hours. After this treatment, the sample is filtered, dried and air calcined at 1000° F. for 3 hours.

What is Claimed is:

1. A method for synthesizing crystalline Kenyaite-type silicate which comprises (i) preparing a mixture capable of forming said silicate, said mixture comprising sources of alkali metal cations (AM), silicon, non-alkali metal (M) of valence n selected from the group consisting of metals of Periodic Table Groups III A, IV B, IV A, VI B and VIII, water and organic agent (R) selected from the group consisting of alkylamine, trialkylamine, a tetraalkylammonium compound and trimethylhexamethylene diamine, said alkyl having 1 to about 12 carbon atoms, and having a composition, in terms of mole ratios, within the following ranges:

| | |
|---|---|
| SiO$_2$/M$_m$O$_n$ | at least about 40 |
| H$_2$O/SiO$_2$ | 5 to 200 |
| OH$^-$/SiO$_2$ | 0 to 5 |
| AM/SiO$_2$ | 0.05 to 3 |

-continued

| | |
|---|---|
| R/SiO$_2$ | 0.01 to 3 |

(ii) maintaining said mixture under sufficient conditions until crystals of said silicate are formed and (iii) recovering said crystalline Kenyaite-type silicate.

2. The recovered crystalline silicate of claim 1.

3. The method of claim 1 wherein said mixture composition is, in terms of mole ratios, as follows:

| | |
|---|---|
| SiO$_2$/M$_m$O$_n$ | 40 to 5000 |
| H$_2$O/SiO$_2$ | 10 to 100 |
| OH$^-$/SiO$_2$ | 0.1 to 2 |
| AM/SiO$_2$ | 0.1 to 1 |
| R/SiO$_2$ | 0.05 to 2 |

4. The method of claim 1 wherein organic agent R is a compound which acts as a mineralizer in the mixture.

5. The method of claim 1 wherein alkyl is propyl.

6. The recovered crystalline silicate of claim 5.

7. A mixture capable of forming crystals of Kenyaite-type silicate upon crystallization, said mixture comprising sources of alkali metal cations (AM), silicon, non-alkali metal (M) of valence n selected from the group consisting of metals of Periodic Table Groups III A, IV B, IV A, VI B and VIII, water and organic agent (R) selected from the group consisting of alkylamine, trialkylamine, a tetraalkylammonium compound and trimethylhexamethylene diamine, said alkyl having 1 to about 12 carbon atoms, and having a composition, in terms of mole ratios, within the following ranges:

| | |
|---|---|
| SiO$_2$/M$_m$O$_n$ | at least about 40 |
| H$_2$O/SiO$_2$ | 5 to 200 |
| OH$^-$/SiO$_2$ | 0 to 5 |
| AM/SiO$_2$ | 0.05 to 3 |
| R/SiO$_2$ | 0.01 to 3 |

8. The mixture of claim 7 with a composition, in terms of mole ratios, as follows:

| | |
|---|---|
| SiO$_2$/M$_m$O$_n$ | 40 to 5000 |
| H$_2$O/SiO$_2$ | 10 to 100 |
| OH$^-$/SiO$_2$ | 0.1 to 2 |
| AM/SiO$_2$ | 0.1 to 1 |
| R/SiO$_2$ | 0.05 to 2 |

9. A crystalline layered silicate material having an X-ray diffraction pattern exhibiting values substantially as set forth in Table 1 of the specification.

10. A catalyst composition comprising the crystalline layered silicate of claim 9.

11. A method for preparing a pillared layered silicate material intercalated with a polymeric chalcogenide which comprises:

providing a crystalline silicate material characterized by an X-ray diffraction pattern exhibiting values substantially as set forth in Table 1 of the specification;

enhancing the interlamellar distance of said layered silicate by impregnating the layered silicate with an organic compound capable of forming a cationic species;

introducing between the layers of said impregnated layered silicate a compound capable of conversion to said chalcogenide and converting said compound to said chalcogenide.

12. The method of claim 11 wherein said cationic species is an organoammonium cation.

13. The method of claim 12 wherein said compound capable of conversion is electrically neutral.

14. The method of claim 13 wherein said compound capable of conversion is hydrolyzable and said product is converted by hydrolysis to form said pillared material.

15. The method of claim 14 wherein said hydrolyzable compound is selected from the group consisting of tetraethylorthosilicate, tetramethylorthosilicate and tetrapropylorthosilicate.

16. The method of claim 15 wherein said hydrolyzable compound is tetraethylorthosilicate.

17. The method of claim 14 wherein said organoammonium cation is C$_3$ or larger alkylammonium.

18. The method of claim 14 wherein said organoammonium cation is n-octylammonium.

19. The method for preparing a pillared layered silicate material intercalated with a polymeric chalcogenide which comprises:

providing a crystalline silicate material of claim 2;

enhancing the interlameller distance of said layered silicate by impregnating the layered silicate with an organic compound capable of forming a cationic species;

introducing between the layers of said impregnated layered silicate a compound capable of conversion to said chalcogenide and converting said compound to said chalcogenide.

20. The product of the method of claim 11.

21. The product of the method of claim 19.

* * * * *